United States Patent

[11] 3,610,680

| [72] | Inventor | Joseph P. Brady<br>Warren, Mich. |
|---|---|---|
| [21] | Appl. No. | 32,832 |
| [22] | Filed | Apr. 29, 1970 |
| [45] | Patented | Oct. 5, 1971 |
| [73] | Assignee | General Motors Corporation<br>Detroit, Mich. |

[54] VEHICLE BODY SUNSHADE
3 Claims, 6 Drawing Figs.

[52] U.S. Cl. ..................................... 296/97 H,
16/150, 112/262, 161/161
[51] Int. Cl. ..................................... B60j 3/02
[50] Field of Search .......................... 296/97 R,
97 G, 97 H, 97 K; 16/150; 161/50, 51, 52, 161;
281/27, 29, 35, 37; 112/262

[56] References Cited
UNITED STATES PATENTS

| 3,085,827 | 4/1963 | Cederberg et al. ........... | 296/97 |
| 3,199,913 | 8/1965 | Field et al. .................... | 296/97 |

*Primary Examiner*—Benjamin Hersh
*Assistant Examiner*—Leslie J. Paperner
*Attorneys*—W. E. Finken and Herbert Furman ABSTRACT: A vehicle body sunshade includes a foundation board having a transverse groove adjacent one end portion thereof to provide a reduced thickness portion. The board is covered with padding and an outer covering in a conventional manner. Stitching through the reduced thickness portion of the board breaks the board at the groove. The stitching and padding and covering cooperate to provide a hinge connecting the end portion to the remainder of the sunshade.

PATENTED OCT 5 1971

3,610,680

INVENTOR
Joseph P. Brady
BY
Herbert Furman
ATTORNEY

VEHICLE BODY SUNSHADE

This invention relates to vehicle body sunshades and more particularly to a vehicle body sunshade having an end portion hinged to the remainder of the sunshade so that the end portion can be moved about the hinge line as required by the curvature of a vehicle body windshield or windshield header.

Vehicle bodies have been conventionally provided with sunshades for many years. Such sunshades are generally mounted at one corner to the body header generally adjacent to and above the windshield pillar and are releasably secured at a corresponding other corner to the body header generally at the centerline of the body. When the curvature of the windshield header and windshield becomes too sharp, the sunshade cannot approximate such curvature and therefore must be spaced beyond a predetermined desired distance from the windshield and windshield header when in its respective operative and stored positions.

The sunshade of this invention includes a hinged end portion which can be moved or swung relative to the remainder of the sunshade to thereby permit the sunshade to be located adjacent the windshield and windshield header when in its operative and stored positions. The hinged end portion is provided without requiring any additional components or parts of the sunshade.

In the preferred embodiment of the invention, the foundation board is grooved transversely thereof adjacent the end portion which is intended to be hinged. This provides a portion of reduced thickness which defines the base of the groove. Thereafter the sunshade is padded and covered in a conventional manner. A stitch line through the reduced thickness portion breaks the foundation board along this line. The stitching, as well as the padding and covering, thereby provide a hinge between the end portion and the remainder of the sunshade.

The primary object of this invention is to provide a vehicle body sunshade with an end portion hinged to the remainder of the sunshade without requiring any additional parts or components beyond those conventionally used in such sunshades. Another object of this invention is to provide a vehicle body sunshade having an end portion hinged to the remainder of the sunshade by a stitch line and by the covering material covering the foundation board.

These and other objects of the invention will be readily apparent from the following specification and drawings wherein.

Figure 1:
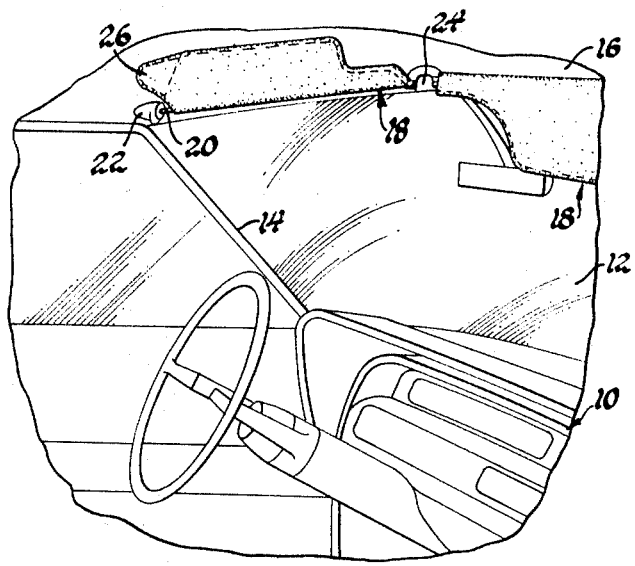
FIG. 1 is a perspective view of a portion of the interior of a vehicle body having a sunshade according to this invention mounted thereon.

Referring now particularly to FIG. 1 of the drawings, a conventional vehicle body designated 10 includes a windshield 12 having its lower edge portion conventionally secured to the cowl structure of the body, its side edge portions conventionally secured to the windshield pillars 14, and its upper edge portion conventionally secured to the windshield header structure 16 of the body. The windshield 12 and header structure 16 are curved transversely of the body as viewed in plan and the windshield is also curved as viewed in elevation.

A pair of sunshades 18 according to this invention are mounted on the header structure 16 in a conventional manner for movement between an operative position, as shown by the left-hand sunshade of FIG. 1, and a stored position, as shown by the right-hand sunshade of FIG. 1. Generally, each sunshade includes a support rod 20 secured at one end to a conventional support 22 for both rotational and translational movement and having its other end releasably secured within a conventional support 24 located generally at the centerline of the body. Rotational movement of the rod 20 relative to the supports 22 and 24 moves the sunshade between its operative and stored positions.

Each rod 20 defines a chord traversing a portion of the arc of curvature of the header structure 16 and windshield 12. When the curvature becomes too sharp, end portions 26 of the sunshades 18 will prematurely engage the windshield and windshield header when the sunshade is moved toward respective operative and stored positions and thereby prevent movement of the sunshades to the desired positions immediately adjacent the windshield and header.

In accordance with this invention, the end portion 26 of each sunshade 18 is hinged to the remainder of the sunshade to thereby permit movement of this end portion relative to the remainder along a hinge axis designated generally 28 in FIG. 1 to thereby permit the sunshade 18 to be moved to positions immediately adjacent the windshield and header.

Figure 4:
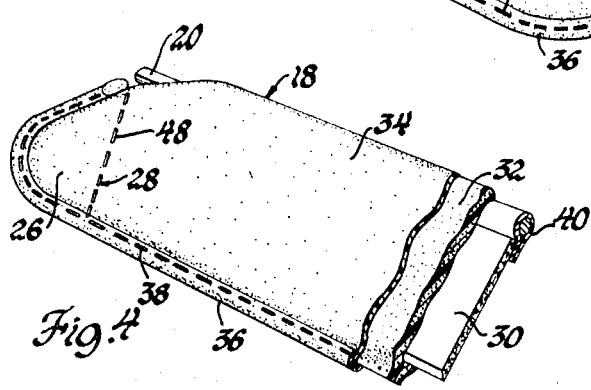
FIG. 4 is a partially broken-away view of a portion of FIG. 1 with the end portion generally coplanar with the remainder of the sunshade.

The sunshade 18 is comprised of conventional parts or components and includes a foundation board 30, padding 32 which is wrapped around the foundation board 30, and an outer skin or covering 34 of vinyl or cloth which is wrapped around the padding 32. A bead 36 receives the end portions or edges of the covering 34 and the padding 32. Stitching 38 secures the bead to the padding and the covering to complete the sunshade. The support rod 20 is secured to the sunshade by a conventional stamped metal hinge 40, shown in FIG. 4.

Figure 3:
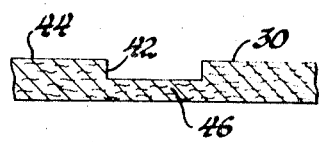
FIG. 3 is an enlarged sectional view taken generally along the plane indicated by line 3—3 of FIG. 2.
Figure 2:
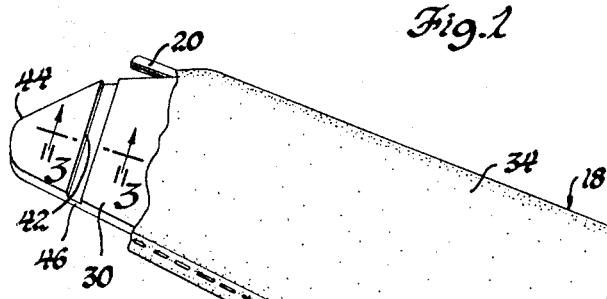
FIG. 2 is an enlarged partially broken-away view of the sunshade.
Figure 6:
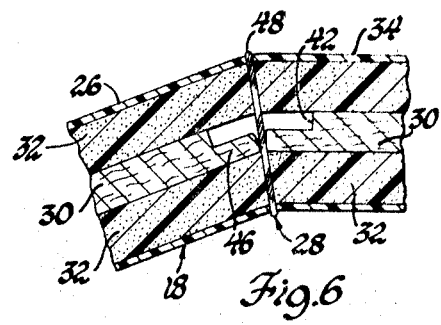
FIG. 6 is an enlarged sectional view taken generally along the plane indicated by line 6—6 of FIG. 5.
Figure 5:
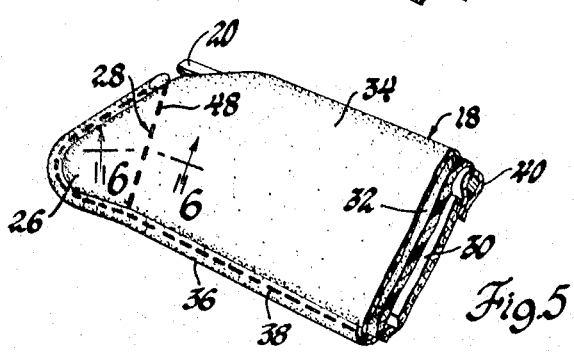
FIG. 5 is a view similar to FIG. 4 with the end portion moved or swung relative to the remainder of the sunshade.

In accordance with this invention, the foundation board 30 is provided with a transverse groove 42 adjacent one end 44 thereof before it is padded and covered. As shown in FIGS 2, 3 and 6, the groove 42 has its base portion defined by a reduced thickness portion 46 of the board. After the sunshade is completed, as set forth hereinbefore, a line of stitching 48 through the covering 34, the padding 32 and the reduced thickness portion 46 breaks the board 30 at this area and also provides a hinge between the resultant end portion 26 and the remainder of the sunshade.

The groove 42 is provided since ordinary sewing machines do not have sufficient power to stitch through the foundation board 30 without breaking needles. Certain types of sewing machines do have such power and in such instances it may not be necessary to groove the foundation board 30.

Thus this invention provides an improved vehicle body sunshade.

I claim:

1. A vehicle body sunshade comprising, in combination, an elongated foundation board, resilient material covering the foundation board and cooperating therewith to provide the sunshade, and at least one line of stitching extending transversely of the sunshade adjacent an end portion thereof, the stitching extending completely through the resilient material and board and severing the end portion of the board from the remainder thereof, the stitching and resilient material providing a hinge between the end portion of the sunshade and the remainder thereof and permitting the end portion to be moved relative to the remainder.

2. A vehicle body sunshade comprising, in combination, an elongated foundation board having a portion of reduced thickness extending transversely thereof adjacent one end portion, resilient material covering the foundation board and cooperating therewith to provide the sunshade, and at least one line of stitching extending completely through the resilient material and reduced thickness portion of the board to sever the end portion of the board from the remainder thereof at the reduced thickness portion, the stitching and resilient material providing a hinge between the end portion of the sunshade and the remainder thereof and permitting the end portion to be moved relative to the remainder.

3. A vehicle body sunshade comprising, in combination, an elongated foundation board having a groove in one surface thereof extending transversely of the board adjacent one end portion to provide a reduced thickness portion, resilient material covering the foundation board and cooperating therewith to provide the sunshade, and at least one line of stitching extending completely through the resilient material and reduced thickness portion of the board to sever the end portion of the board from the remainder thereof at the reduced thickness portion, the stitching and resilient material providing a hinge between the end portion of the sunshade and the remainder thereof and permitting the end portion to be moved relative to the remainder.